United States Patent
Führer

(10) Patent No.: US 6,655,753 B1
(45) Date of Patent: Dec. 2, 2003

(54) CIRCUIT ARRANGEMENT FOR THE BRAKE SYSTEM OF A MOTOR VEHICLE

(75) Inventor: Jochen Führer, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/913,336

(22) PCT Filed: Feb. 28, 2000

(86) PCT No.: PCT/EP00/01656

§ 371 (c)(1),
(2), (4) Date: Dec. 11, 2001

(87) PCT Pub. No.: WO00/51864

PCT Pub. Date: Sep. 8, 2000

(30) Foreign Application Priority Data

| Mar. 4, 1999 | (DE) | 199 09 457 |
| Jun. 26, 1999 | (DE) | 199 44 091 |

(51) Int. Cl.[7] .................... B60T 8/86
(52) U.S. Cl. .................... 303/125; 303/170; 303/192
(58) Field of Search .................... 701/94, 78, 79, 701/81; 180/170; 303/125, 192, 123, 121, 170, 186

(56) References Cited

U.S. PATENT DOCUMENTS

| 3,800,904 | A | * | 4/1974 | Zelenka | 180/170 |
| 5,003,483 | A | * | 3/1991 | Hedstrom | 701/93 |
| 5,423,601 | A | * | 6/1995 | Sigl | 303/182 |
| 5,918,953 | A | * | 7/1999 | Nihei et al. | 303/190 |
| 5,997,108 | A | * | 12/1999 | Claussen et al. | 303/192 |
| 6,193,333 | B1 | * | 2/2001 | Guest | 303/192 |
| 6,199,964 | B1 | * | 3/2001 | Ota et al. | 303/192 |
| 6,233,514 | B1 | * | 5/2001 | Claussen et al. | 701/93 |

FOREIGN PATENT DOCUMENTS

| DE | 695 08 778 | 7/1997 |
| EP | 0 856 446 | 8/1998 |

* cited by examiner

*Primary Examiner*—Jack Lavinder
*Assistant Examiner*—Benjamin A Pezzlo

(57) ABSTRACT

A method for determining parameters for the viscosity or temperature of a brake fluid of a vehicle by way of a predetermined pressure build-up within time limits in at least one defined section of a brake circuit and for detecting a pressure in the said section and/or a time which is required for the build-up of the said pressure.

13 Claims, 1 Drawing Sheet

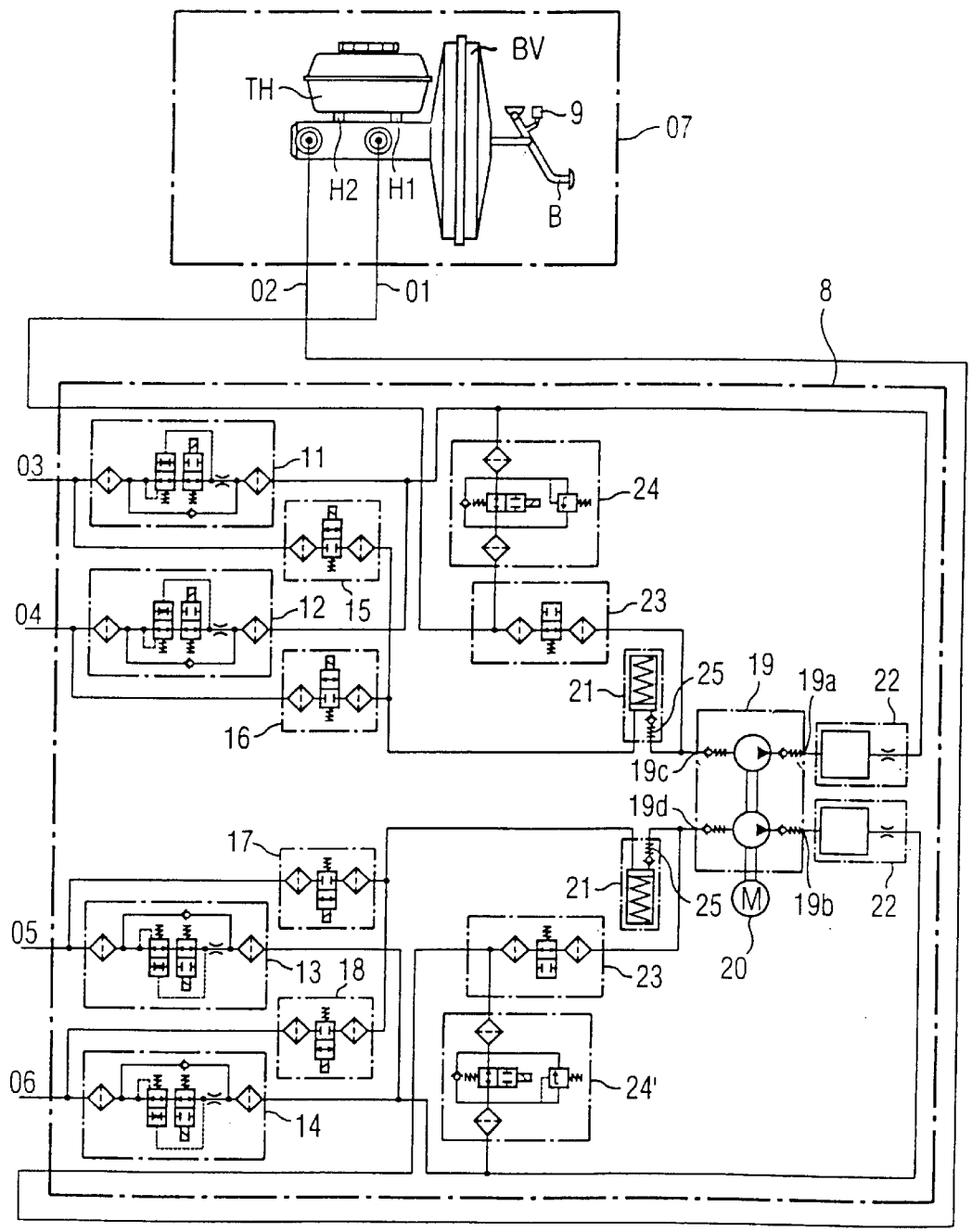

CIRCUIT ARRANGEMENT FOR THE BRAKE SYSTEM OF A MOTOR VEHICLE

The present invention relates to a circuit arrangement for a brake system for a motor vehicle comprising a first axle and a second axle, at least one circuit which conditions and evaluates sensor signals, determines speed, deceleration, and/or acceleration of individual wheels and compares resulting values one to the other and to predetermined threshold values.

A circuit arrangement of this type is e.g. used in vehicles driving at a controlled- speed on slopes. A generic circuit arrangement is known from International patent application PCT/WO 96/11826 and European patent application EP 0 856 446 A1. The circuit arrangement is so designed that a predetermined nominal speed is adjusted by controlling the brake pressure on all four wheels of a vehicle. The normal ABS function is activated in the event of an imminent locked condition of a wheel.

The circuit arrangement disclosed in European patent application EP 0 856 446 A2 and International patent application PCT/WO 96/11826 executes a speed control when driving on a slope (Hill Descent Control—HDC).

The HDC function cannot be deactivated when a fault occurs because the motor vehicle would heavily accelerate in the event of a sudden pressure decrease in the brakes and downhill driving. The driver of the motor vehicle could apply the brakes, however, there is the risk that the vehicle has reached a dangerously high speed already prior to application of the brakes.

Maintaining the HDC mode upon failure or deactivation of an anti-lock system of the motor vehicle is equally dangerous. With a steeper road downgrade, locking of the wheels and, hence, loss in steerability is imminent.

An object of the present invention is to provide a circuit arrangement which permits simultaneously slowing down and maintaining the steerability. In particular, the circuit arrangement is to render possible safe riding on slopes. Another objective of the, circuit arrangement is to function even upon failure of an anti-lock system.

According to the present invention, this object is achieved in that a generic circuit arrangement is configured so that the circuit arrangement can activate an emergency function where the wheels are braked to the extent that at least one wheel of the first axle and one wheel of the second axle exhibit a minimum speed.

The present invention arranges for a circuit arrangement to include an emergency function. The emergency function is activated when a fault occurs, e.g. upon failure or disconnection of an anti-lock system. In case a wheel sensor is defective, for example, switch-over is made to a special calculation of a reference speed for checking the descent speed. It is particularly suitable that the circuit arrangement activates the emergency function when the vehicle rides on slopes.

It is favorable that the circuit arrangement activates the emergency function in the event of a defect in the circuit and/or in a sensor.

Further, it is appropriate that the emergency function can be activated by a switch.

It is especially favorable to configure the circuit arrangement so that the circuit arrangement determines the fastest wheel for each of the axles, subsequently selects the slower one of the faster wheels of the two axles and controls the speed of the selected wheel so that-this speed generally corresponds to a preadjusted nominal speed. The nominal speed depends on the driving situation and preferably amounts to 4 km/h up to 50 km/h.

It is hereby ensured that at least one wheel on each axle runs at a minimum speed or a higher speed. The result is that steerability and stability are maintained to a limited extent which is sufficient for low speeds though, inasmuch as checking of the descent speed is continuously performed. The checking of the descent speed which is effected already prior to a fault of the sensor and/or the circuit is hereby continued when a defect occurs without involving a risk. Further, uncontrolled acceleration of the vehicle is prevented because only one wheel is allowed to exceed the nominal speed.

Another advantage of the present invention is that the configuration of the anti-lock system, more particularly, its fail-safe concept, need not be modified. Therefore, the anti-lock system can switch off as usual, or switch over to an emergency function, respectively.

It is especially expedient to design the circuit arrangement so that the speed of the selected wheel is controlled by a modulation of the brake pressure on several wheels.

An advantageous embodiments of the circuit arrangement involves that the control is so performed that at least two wheels still have a defined minimum speed.

In another preferred embodiment of the circuit arrangement, the control is performed so that an acceleration of one or more wheels is measured and included in the speed control.

Besides, it is suitable that the circuit arrangement determines a reference speed and controls speeds of wheels so that the reference speed generally corresponds to a preset nominal speed.

This embodiment of the circuit arrangement allows using a reference speed for the control instead of, or in addition to, the speed of the selected wheel.

It is especially favorable that the reference speed is formed of one wheel selected by the circuit arrangement and at least one further wheel.

The wheel or the further wheels whose speed is taken into account in the reference speed is/are e.g. the fastest wheel and/or other wheels of the automotive vehicle.

The circuit arrangement can be adapted to driving stability characteristics of the motor vehicle because the reference speed is formed by taking into consideration the speeds of the wheels with different evaluation factors.

A first embodiment which is easy to implement can be achieved in that the evaluation factors are invariable.

An adaption to the respective driving situation can be achieved in that the evaluation factors are variable.

It is especially favorable that the speed of the selected wheel is included in the calculation of the reference speed with an evaluation factor ranging between 0.4 and 0.9.

It is especially expedient to design the circuit arrangement so that the reference speed is controlled by a modulation of the brake pressure on several wheels.

Further advantages, special features and preferred aspects of the present invention can be taken from the following description of preferred embodiments by way of the accompanying drawing.

The drawing shows an embodiment of operating and hydraulic elements for the implementation of a circuit configuration according to the present invention. Intersecting lines are connected to one another only when a point is indicated at the intersection of the lines.

The operating and hydraulic elements from a dual-circuit brake system with two brake circuits 1, 2. the dual-circuit brake system comprises a tandem master cylinder TH. A brake pedal B is connected to the tandem master cylinder TH by way of a linkage and a brake force booster BV. The tandem master cylinder TH is comprised of two master cylinders connected one after the other.

Each one of the master cylinders H1, H2 serves for the actuation of a brake circuit 1 or 2, respectively. It is especially suitable that the dual-circuit brake system has a diagonal split-up. In this arrangement, one front wheel and one diagonally opposite rear wheel form a brake circuit. Upon failure of one brake circuit, the wheels pertaining to this brake circuit transmit cornering forces even if wheels of the still intact brake circuit lock.

The present invention will be shown in the following by way of a diagonal split-up of the brake system. However, other embodiments of the brake system such as a so-called front-axle/rear-axle split-up or an Y-split-up are likewise possible. In a front-axle/rear-axle split-up of a brake system, the front axle and the rear axle are associated with separate brake circuits. In an Y-split-up, each brake circuit acts on the front axle and on one rear wheel.

The illustrated brake system with two brake circuits 1, 2 opens into four pressure lines 3, 4, 5, 6 by way of further hydraulic elements. The pressure line 3 leads to the front right wheel of a vehicle in which the brake system is mounted; the pressure line 4 leads to a disc brake for a rear left wheel; the pressure line 5 leads to a disc brake for a rear right wheel, and the pressure line 6 leads to a disc brake for a front left wheel.

The hydraulic elements disposed between the pressure lines 3, 4, 5, 6 and the brake circuits 1, 2 form a hydraulic control unit 8.

The brake pedal B, the brake force booster BV, and the tandem master cylinder TH form a brake actuating unit 7. In the brake actuating unit 7, a brake actuating switch 9 is arranged which recognizes a depression of the brake pedal B.

The pressure lines 3, 4, 5, 6 leading to the disc brakes are respectively connected to one inlet valve 11, 12, 13, 14.

Reference numeral 11 designates the inlet valve to the pressure line 3 leading to the front right disc brake, reference numeral 12 designates the inlet valve to the pressure line 4 leading to the rear left disc brake, reference numeral 13 refers to the inlet valve to the pressure line 5 leading to the rear right disc brake, and reference-numeral 14 refers to the inlet valve to the pressure line 6 leading to the front left disc brake.

The inlet valves 11, 12, 13, 14 are configured so that they are open in their deenergised condition. An electric signal is necessary for them to close.

Each of the pressure lines 3, 4, 5, and 6 is respectively connected to an outlet valve 15, 16, 17, or 18. Reference numeral 15 designates the outlet valve to the pressure line 3, 16 refers to the outlet valve to the pressure line 4, reference numeral 17 is the outlet valve to the pressure line 5, and 18 designates the outlet valve to the pressure line 6.

The inlet valves 11, 12 are connected to an outlet 19a of a dual-circuit hydraulic pump 19. The inlet valves 13, 14 are connected to an outlet 19b of the hydraulic pump 19.

The hydraulic pump 19 is driven by a motor 20. The embodiment shown with a dual-circuit hydraulic pump is particularly economical because only one pump with a motor 20 is required. Another design, for example with two separate pumps, is alternatively possible, however, necessitates a higher expenditure in structure and increases the weight of the hydraulic control unit 8.

The outlet valves 15, 16 are connected to an inlet 19c of the hydraulic pump 19. The outlet valves 17, 18 are connected to another input 19d of the hydraulic pump 19.

Abrupt pressure variations of the hydraulic pump 19 are attenuated by interposing damping chambers 22 between the outputs 19a and 19b of the hydraulic pump 19 so that these pressure variations do not reach up to the inlet valves 11, 12, 13 or 14.

The outlet valves 15, 16, 17, and 18 are connected to low-pressure accumulators 21. The low-pressure accumulators 21 permit a rapid pressure decrease of the brake fluid in the disc brakes.

Further, the hydraulic control unit 8 contains two electric change-over valves 23 which are respectively connected to a TCS separating valve 24 of a traction control system.

The electric change-over valves 23 connect the brake circuits 1, 2 to the inputs 19c and 19d of the hydraulic pump 19.

The TCS separating valves 24 permit a pressure build-up in the disc brakes of the vehicle by way of the inlet valves 11, 12, 13 or 14 irrespective of an application of the brake pedal B by a driver of the vehicle.

The brake system is controlled by a circuit arrangement. The circuit arrangement comprises at least one circuit which conditions and evaluates sensor signals, determines speed, deceleration, and/or acceleration of individual wheels and compares resulting values with one another and with predetermined threshold values. The circuit arrangement is configured so that an emergency function is activated in the event of a defect in the circuit and/or in at least one sensor.

While the anti-lock system prevents locking of the wheels in a normal operating condition, upon failure of the anti-lock system, the emergency function will be activated so that the wheels are braked to the extent that at least one wheel of the first axle and one wheel of the second axle exhibit a minimum speed.

The circuit arrangement is configured so that it can determine the fastest wheel for each of the axles, especially when the vehicle rides on a slope. After the fastest wheel of each of the axles has been determined, the slower wheel of the fastest wheels of the two axles is chosen, and the speed of this wheel is controlled so that this speed generally corresponds to a preset nominal speed and that at least one minimum speed is maintained.

Alternatively, a reference speed can be produced and used for the control. For example, the reference speed is formed as follows: $v_{Ref} = 0.3\, v_{fastest\ wheel} + 0.6\, v_{selected\ wheel} + 0.1\, v_{secondfastest\ wheel}$.

List of Reference Numeral:

A all-wheel drive mode
B brake pedal
BV brake force booster
H1 master cylinder
H2 master cylinder
P parking position
S ignition start
TH tandem master cylinder
1 brake circuit
2 brake circuit
3 pressure line
4 pressure line
5 pressure line
6 pressure line
7 brake actuating unit
8 hydraulic control unit
9 brake actuation switch
11 inlet valve 12 inlet valve
13 inlet valve
14 inlet valve
15 outlet valve
16 outlet valve
17 outlet valve
18 outlet valve
19 hydraulic pump
19*a* outlet
19*b* outlet
19*c* inlet
19*d* inlet
20 motor
21 low-pressure accumulator
22 damping chamber
23 change-over valve
24 TCS separating valve
24' TCS separating valve

What is claimed is:

1. A circuit arrangement for a brake system for a motor vehicle having a first axle and a second axle, and wheels on said axles, at least one circuit which conditions and evaluates sensor signals, determines speed, deceleration, and/or acceleration of an individual one of said wheels and compares resulting values one to the other and to predetermined threshold values, characterized in that the circuit arrangement can activate an emergency function where said wheels are braked to the extent that at least one wheel of the first axle and one wheel of the second axle exhibit a minimum speed and further wherein the circuit arrangement determines the faster wheel one of said wheels for each of the axles, subsequently selects the slower wheel of the faster wheels of the two axles and controls the speed of the slower wheel so that this speed generally corresponds to a preadjusted nominal speed.

2. A circuit arrangement as claimed in claim 1, wherein the circuit arrangement activates the emergency function when the vehicle rides on slopes.

3. A circuit arrangement as claimed in claim 1 wherein the circuit arrangement activates the emergency function in the event of a defect in the circuit.

4. A circuit arrangement as claimed in claim 1 wherein the circuit arrangement activates the emergency function in the event of a defect of a sensor.

5. A circuit arrangement as claimed in claim 1 wherein the circuit arrangement includes an off/on switch.

6. A circuit arrangement as claimed in claim 1 wherein the speed of a selected wheel is controlled by a modulation of the brake pressure on several wheels.

7. A circuit arrangement as claimed in claim 1 wherein the control is performed so that an acceleration of one or more wheels is measured and included in the speed control.

8. A circuit arrangement as claimed in claim 1 wherein the circuit arrangement determines a reference speed and controls speeds of wheels so that the reference speed generally corresponds to a preset nominal speed.

9. A circuit arrangement as claimed in claim 8 wherein the reference speed is formed based on the slower wheel and at least one further wheel.

10. A circuit arrangement as claimed in claim 9 wherein the reference speed is determined by adding the speed of the slower wheel multiplied by a first evaluation factor and the speed of at least one faster wheel multiplied by a second evaluation factor.

11. A circuit arrangement as claimed in claim 10 wherein the first and second evaluation factors are invariable.

12. A circuit arrangement as claimed in claim 10 wherein the first and second evaluation factors are variable.

13. A circuit arrangement as claimed in claim 8 wherein the reference speed is controlled by a modulation of the brake pressure on several wheels.

* * * * *

UNITED STATES PATENT AND TRADEMARK OFFICE
CERTIFICATE OF CORRECTION

PATENT NO.    : 6,655,753 B1
DATED         : December 2, 2003
INVENTOR(S)   : Jochen Fuhrer It is certified that error appears in the above-identified patent and that said Letters Patent is hereby corrected as shown below:

<u>Column 5,</u>
Line 34, after "faster", delete "wheel".

Signed and Sealed this

Thirtieth Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,655,753 B1
DATED : December 2, 2003
INVENTOR(S) : Jochen Fuhrer

It is certified that error appears in the above-identified patent and that said Letters Patent is hereby corrected as shown below:

Title page,
Item [57], ABSTRACT,
Replace the ABSTRACT with the following:

-- A circuit arrangement for a brake system for a motor vehicle comprising a first axle and a second axle, at least one circuit which conditions and evaluates sensor signals, determines speed, deceleration, and/or acceleration of individual wheels and compares resulting values one to the other and to predetermined threshold values. The circuit arrangement is characterized by that an emergency function is activated in the event of a defect of the circuit and/or at least one sensor where the wheels are braked to the extent that at least one wheel of the first axle and one wheel of the second axle exhibit a minimum speed. --

Signed and Sealed this

Tenth Day of August, 2004

JON W. DUDAS
*Acting Director of the United States Patent and Trademark Office*